US009701158B2

(12) United States Patent
Pellicano et al.

(10) Patent No.: US 9,701,158 B2
(45) Date of Patent: Jul. 11, 2017

(54) VARIABLE TRACK WHEEL

(71) Applicant: Titan Italia S.P.A., Crespellano (IT)

(72) Inventors: Pasquale Patrizio Pellicano, Bologna (IT); Graziano Donati, Bologna (IT)

(73) Assignee: Titan International, Inc., Quincy, IL (US)

( * ) Notice: Subject to any disclaimer, the term of this patent is extended or adjusted under 35 U.S.C. 154(b) by 100 days.

(21) Appl. No.: 14/367,381

(22) PCT Filed: Dec. 10, 2012

(86) PCT No.: PCT/IB2012/057135
§ 371 (c)(1),
(2) Date: Jun. 20, 2014

(87) PCT Pub. No.: WO2013/093703
PCT Pub. Date: Jun. 27, 2013

(65) Prior Publication Data
US 2014/0368025 A1 Dec. 18, 2014

(30) Foreign Application Priority Data

Dec. 20, 2011 (EP) .................................... 11194646

(51) Int. Cl.
*B60B 3/04* (2006.01)
*B60B 23/12* (2006.01)
(Continued)

(52) U.S. Cl.
CPC ................ *B60B 23/12* (2013.01); *B60B 3/00* (2013.01); *B60B 3/04* (2013.01); *B60B 23/00* (2013.01);
(Continued)

(58) Field of Classification Search
CPC .. B60B 3/04; B60B 3/12; B60B 23/10; B60B 2900/116; B60B 2900/351
See application file for complete search history.

(56) References Cited

U.S. PATENT DOCUMENTS 2,245,574 A * 6/1941 Danhaus ................. B60B 23/12
301/18
2,793,913 A * 5/1957 Stough .................... B60B 23/12
301/9.2
(Continued)

FOREIGN PATENT DOCUMENTS

EP 0911183 A2 4/1999
EP 1174285 A2 1/2002
(Continued)

*Primary Examiner* — Katy M Ebner
(74) *Attorney, Agent, or Firm* — Davis, Brown, Koehn, Shors & Roberts, P.C.; Kent A. Herink

(57) ABSTRACT

A variable track wheel (1) comprises a rim (2) suitable for receiving a tire, and a disc (3) through which said wheel (1) is mountable on a hub (37), said disc (3) being removably secured by fastenings (6) to a connecting member (4) provided in said rim (2), said connecting member (4) projecting towards a rotation axis (X) of said wheel (1), said wheel further comprising a plurality of spacers (15) interposed between an annular perimeter zone (36) of said disc (3) and said connecting member (4) of said rim (2), said disc (3) and said rim (2) being mountable in a plurality of reciprocal axial positions and in a plurality of reciprocal orientations to obtain a variation in the track of said wheel (1), said wheel (1) further comprising at least one centring device (8; 9) for mutual positioning of said disc (3) and of said rim (2), said centring device (8; 9) comprising a hole (10; 10*a;* 10*b*) and a pin (11), said hole (10; 10*a;* 10*b*) or said pin (11) being provided in said connecting member (4) or in said disc (3), said centring device (8; 9) further comprising a coupling element (21) so conformed as to cooperate with (Continued)

said hole (10; 10*a*; 10*b*) and with said pin (11) for reciprocally coupling said pin (11) and said hole (10; 10*a*; 10*b*).

7 Claims, 4 Drawing Sheets

(51) Int. Cl.
*B60B 23/00* (2006.01)
*B60B 3/00* (2006.01)
*B60B 23/10* (2006.01)

(52) U.S. Cl.
CPC ........ *B60B 23/10* (2013.01); *B60B 2310/305* (2013.01); *B60B 2360/10* (2013.01); *B60B 2900/116* (2013.01); *B60B 2900/351* (2013.01)

(56) References Cited

U.S. PATENT DOCUMENTS

| | | | | |
|---|---|---|---|---|
| 4,178,042 A * | 12/1979 | Sykes | ............. | B60B 23/12 301/16 |
| 4,279,446 A * | 7/1981 | Bushmeyer | ............. | B60B 3/002 301/20 |
| 4,515,411 A * | 5/1985 | Taylor | ............. | B60B 23/12 301/11.1 |
| 4,643,484 A * | 2/1987 | Luter | ............. | B60B 23/12 301/11.1 |
| 4,883,324 A * | 11/1989 | Fuchs | ............. | B60B 23/12 301/11.1 |
| 4,925,248 A * | 5/1990 | Aderer | ............. | B60B 23/12 301/11.1 |
| 5,067,776 A * | 11/1991 | Aderer | ............. | B60B 23/12 301/9.2 |
| 5,560,686 A * | 10/1996 | Sayer | ............. | B60B 23/12 301/11.3 |
| 5,938,291 A * | 8/1999 | Pankhurst | ............. | B60B 23/12 301/10.1 |
| 6,273,515 B1 * | 8/2001 | Taylor | ............. | B60B 23/12 301/11.3 |
| 2008/0054714 A1 * | 3/2008 | Morrow | ............. | B60B 23/10 301/63.101 |
| 2011/0101770 A1 * | 5/2011 | Brame | ............. | B60B 3/044 301/95.101 |

FOREIGN PATENT DOCUMENTS

| | | | | |
|---|---|---|---|---|
| EP | 1186442 B1 | 5/2005 | | |
| IT | EP 1186442 A2 * | 3/2002 | ............. | B60B 3/002 |
| NL | WO 2010093236 A1 * | 8/2010 | ............. | B60B 23/12 |
| WO | 9720704 | 6/1997 | | |
| WO | 2010093236 A1 | 8/2010 | | |

* cited by examiner

VARIABLE TRACK WHEEL

This application claims priority to International Patent Cooperation Treaty Application Serial No. PCT/IB2012/057315, filed on Dec. 10, 2012, which claims priority to European Patent Application No. 11194646.3 filed on Dec. 20, 2011, which is incorporated herein in its entirety by this reference.

BACKGROUND OF THE INVENTION

The invention relates to a variable track wheel of the type comprising a rim and a disc mounted together in a removable manner.

Variable track wheels comprising a rim are known, on which the tyre is mounted, having a cylindrical base on the internal circumferal surface of which there is provided a connecting member that projects radially towards the rotation axis of the wheel. A disc is removably secured to the connecting member, the wheel being fitted to a hub by means of the disc. The connecting member comprises a circumferally continuous single annular element or a plurality of circumferally equidistant lobes.

The disc is secured to the connecting member by fastenings, such as fixing bolts, passing through connecting holes provided in both disc and connecting member. As the disc has a concave face and a corresponding convex fact, by varying the axial mounting position between the rim and disc, or by rotating the disc around the vertical diameter thereof, the distance varies between the median plane of the rim and the plane of the hub against which the disc is mounted, this causing a pair of wheels on the same axle to be brought nearer or moved further away. Such wheels are, for example, used as wheels of agricultural machines, such as tractors, in which, to comply with different agricultural applications, the rim and the disc must be able to be assembled according to alternative axial positions or orientations.

One drawback of variable track wheels of known type is that as they are wheels of relatively large dimensions, it is rather difficult to assemble the disc and the rim in such a manner that the respective rotation axes are effectively coaxial. In fact, gravity and the play between the fixing bolts and the connecting holes provided on both disc and connecting member, to ensure assembly thereof, cause the axis of the disc, once mounted, not to be aligned on the axis of the rim. This axial misalignment between rim and disc has a negative effect on the stroke and performance features of the vehicle on which the wheel is mounted. In particular, the misalignment causes vibrations that are transmitted to the vehicle, with the risk of causing the driver problems of comfort or even problems of safety due to instability of the vehicle.

This is particularly relevant to vehicles that are arranged for travelling at relatively high speeds, for example even at 50 kilometers an hour.

Variable track wheels are known in which the misalignment of the axes of the disc and of the rim has been considered.

EP0808250 discloses a variable track wheel in which the disc is provided with additional holes that during mounting are aligned on at least two indicators or holes provided on the rim and reciprocally coupled by centring plugs that can be removed once the fixing bolts have been tightened.

EP0911183 discloses a variable track wheel wherein the disc is provided with a pair of diametrically opposite centring pins, arranged for coupling with a plurality of pairs of corresponding diametrically opposite holes obtained on the connecting member. The centring systems of known type are not designed for repeating centring during mounting of the disc and of the rim after first mounting.

In fact, during removal of the centring pins or during subsequent inserting of the pins into the corresponding holes, the walls of the holes into which the centring pins have to be inserted for centring can become damaged, this causing possible play that reduces the precision of the subsequent mounting.

Still another drawback of known systems is that in the event of replacement of only the rim or only the disc with a new rim or a new disc, the new rim or the new disc has to be provided with holes or pins having dimensions that are compatible with those found on the piece with which they have to be coupled. This means that a large number of spare parts have to be kept in store so that one disc model can be mounted on a plurality of models of rim and vice versa the same centring system can be maintained.

Alternatively, to mount, for example, a new disc on an old rim, it is necessary to work on the old rim or on the new disc, for example, to match the dimensions of the holes with those of the pins, this increasing significantly the time and cost of replacement. Lastly, the centring systems of known type are not effective on all the types of variable track wheel, in particular on wheels comprising spacers between the disc and connecting member.

One object of the invention is to improve the centring systems of known type to limit the misalignment of the axes of the disc and of the rim of a wheel. A further object is to obtain a variable track wheel in which the disc and the rim can be replaced individually with spare parts, without it being necessary to perform mechanical machinings to adapt the centring system of the spare part with that of the disc and/or of the rim that has not been replaced.

Still another object is to provide a centring system that can be applied to a variable track wheel comprising spacers between the disc and connecting member. Another object is to obtain a variable track wheel in which the mounting position between disc and rim ensures a set balance of the wheel.

A still further object is to produce a variable track wheel, in which the mounting position between disc and rim corresponding to a set balance of the wheel can be refound with a certain precision at each reassembly of the disc of the rim following the first mounting during manufacture.

According to the invention, a variable track wheel is provided comprising a rim that is suitable for receiving a tyre, and a disc through which said wheel is mountable on a hub, said disc being removably secured by fastenings to a connecting member provided in said rim, said connecting member projecting towards a rotation axis of said wheel, said wheel further comprising a plurality of spacers interposed between an annular perimeter zone of said disc and said connecting member of said rim, said disc and said rim being mountable in a plurality of reciprocal axial positions and in a plurality of reciprocal orientations to obtain a variation in the track of said wheel, said wheel further comprising at least one centring device for mutual positioning of said disc and of said rim, said centring device comprising a hole and a pin, said hole or said pin being provided in said connecting member or in said disc, characterised in that said centring device further comprises a coupling element shaped in such a manner as to cooperate with said hole and with said pin for mutually coupling said pin and said hole.

Owing to the coupling element, the diameter of the hole/pin provided on the connecting member can also be substantially different from the diameter of the pin/hole provided on the disc, inasmuch as it is the coupling element that adapts the dimensions of the hole to those of the pin.

In one embodiment, the wheel comprises two centring devices, each of which is provided with a corresponding coupling element.

In a further embodiment, the two centring devices are diametrically opposite and are dimensionally different from one another, i.e. the pin, the hole and the coupling element of the first centring device have dimensions—in particular the diameter—other than those of the respective pin, hole and coupling element of the second centring device.

This enables the mounting position of the rim and of the disc to be found unequivocally, whatever the mutual axial position or orientation of the rim and disc, and enables a set balance of the wheel to be obtained.

As the wheel comprises spacers that are interposed between said connecting member and said disc and retained between said connecting member and said disc by the fastenings, in particular by bolts, the coupling element, in addition to coupling the pin with the hole, compensates the distance imposed by the spacers between the disc and the connecting member.

BRIEF DESCRIPTION OF THE FIGURES

The invention can be better comprised and implemented with reference to the attached drawings, which illustrate one embodiment thereof by way of non-limiting example, in which:

FIGS. 1 and 2 show a variable track wheel 1, comprising a rim 2 that is suitable for receiving a tyre, which is not shown, and a disc 3 through which the wheel 1 is mountable on a hub, which is also shown.

The rim 2 comprises a connecting member 4, that projects from an internal circumferal surface 5 of the rim 2 to a rotation axis X of the wheel 1.

Figure 1:
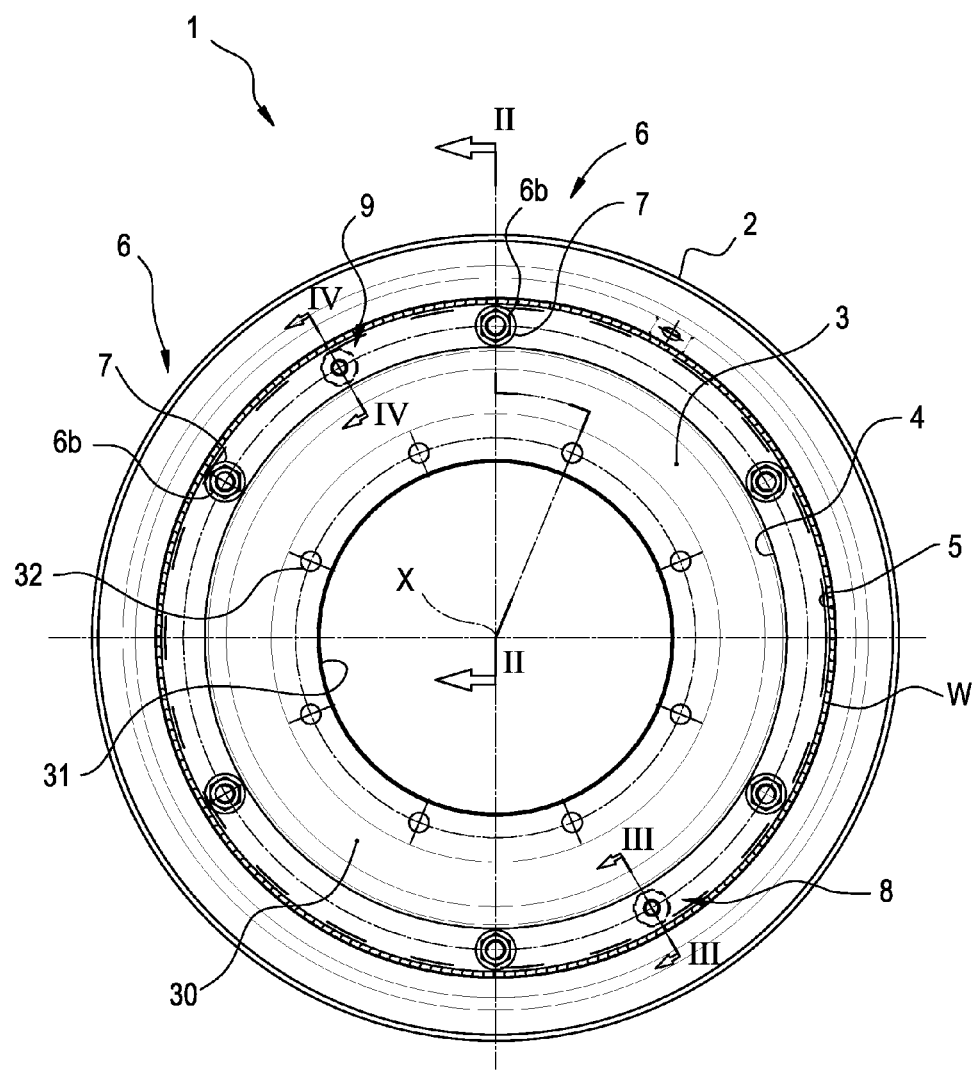
FIG. 1 is a front view of a variable track wheel.
Figure 2:
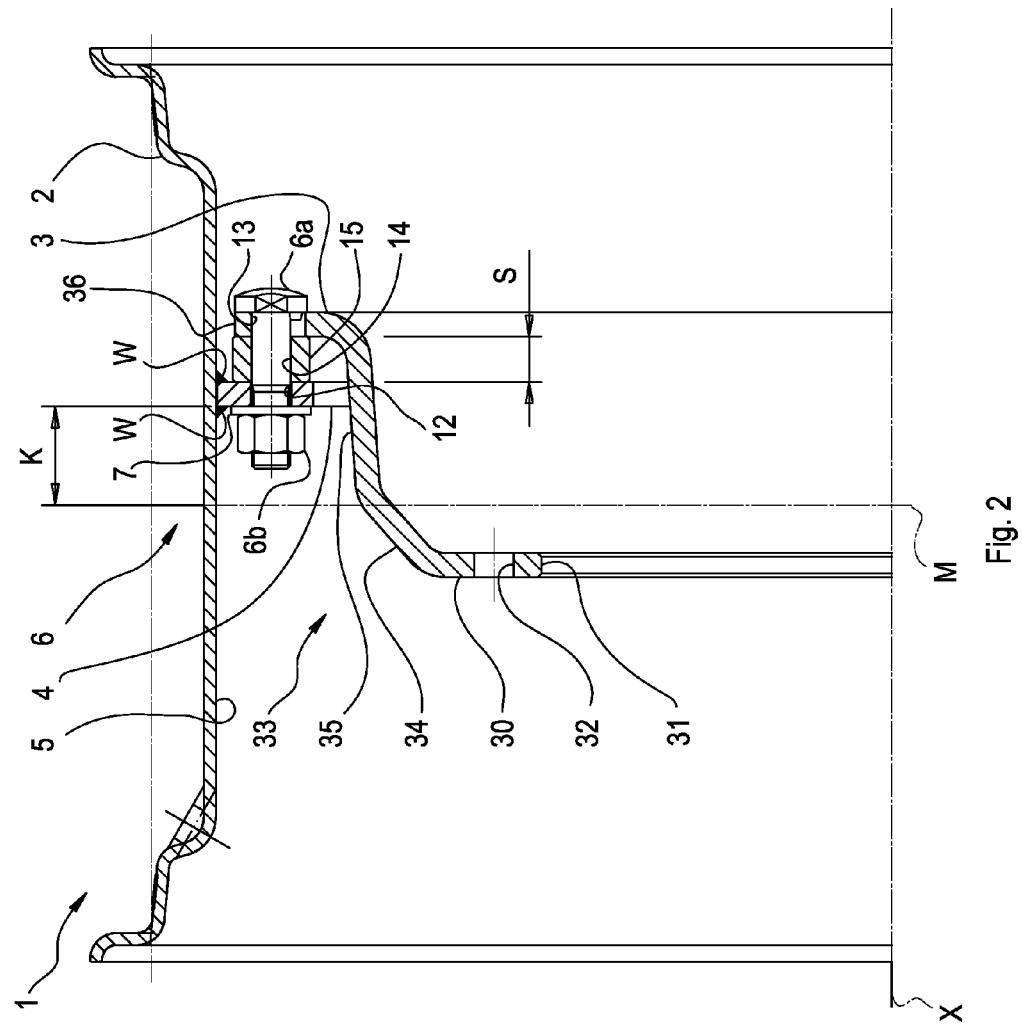
FIG. 2 is an enlarged cross section taken along the plane II-II in FIG. 1.

The connecting member 4 comprises a circumferally continuous singular annular element, which is fixed to the internal circumferal surface 5 for example by welding, in particular angular welding, indicated by W in FIGS. 1 and 2.

In one alternative embodiment that is not shown, instead of a circumferally continuous singular annular element, the connecting member 4 can comprise a plurality of circumferally equidistant lobes.

The connecting member 4 is substantially flat, i.e. extends parallel to a central diametral plane of the rim 2—and thus of the wheel 1, of line M in FIG. 2, at a preset distance K from the latter.

The disc 3 comprises a flat central region 30 in which a central opening 31 is provided that is arranged for receiving a portion of the hub. In the flat central region 30 a plurality of peripheral openings 32 are also provided that are angularly equidistant from one another and are arranged around the central circular opening 31, to mount the disc 3, and thus the wheel 1, on the hub, by means of removable connecting means such as, for example, bolts. The disc 3 further comprises a shaped region 33, for example of conical shape, which can include a first conical portion 34 and a second conical portion 35, wherein the first conical portion 34 has an angle at the vertex of the cone corresponding thereto that is greater than the angle at the vertex of the cone corresponding to the second conical portion 35. The disc 3 further comprises a flange region 36 of annular and substantially flat shape, arranged for facing the connecting member 4.

Between the disc 3 and the connecting member 4 spacers 15 are interposed. The disc 3 is removably secured to the connecting member 4 by fastenings, in particular bolts 6, each bolt 6 comprising a screw 6a and a nut 6b. One or more washers 7 can be associated with the bolt 6 in the known manner. Each bolt 6 is received in a passage 12 provided in the connecting member 4 and in a fixing hole 13 provided in the disc 3, in particular in the flange region 36. Each bolt 6 is then received in a through hole 14 of the respective spacer 15, which is interposed between the connecting member 4 and the disc 3 at each passage 12 and each fixing hole 13.

In the embodiment shown, on the connecting member 4 six passages 12 are provided, and respectively on the disc 3 six fixing holes 13 are provided. The passages 12 and the fixing holes 13 are angularly equidistant. In the embodiment shown, six spacers 15 are therefore provided.

The spacers 15 have a set thickness S, by means of which it is possible to obtain a plurality of tracks that are different from one another according to the position and orientation of the disc 3 with respect to the rim 2 and of the rim 2 with respect to the hub.

The wheel 1 comprises one centring device for mutual positioning of the disc 3 and of the rim 2.

In particular, the wheel 1 comprises of pair of centring devices 8, 9 for mutual positioning of the disc 3 of the rim 2.

The pair of centring devices 8, 9 comprises a first centring device 8 and a second centring device 9, which are in particular diametrically opposite one another.

Each centring device 8, 9 is arranged in a respectively intermediate zone between two consecutive bolts 6.

The first centring device 8 and a second centring device 9 are in particular arranged substantially at the same distance from the rotation axis (X).

Subsequently, the common elements of the first centring device 8 and of the second centring device 9 are indicated by the same reference numbers.

Figure 5:
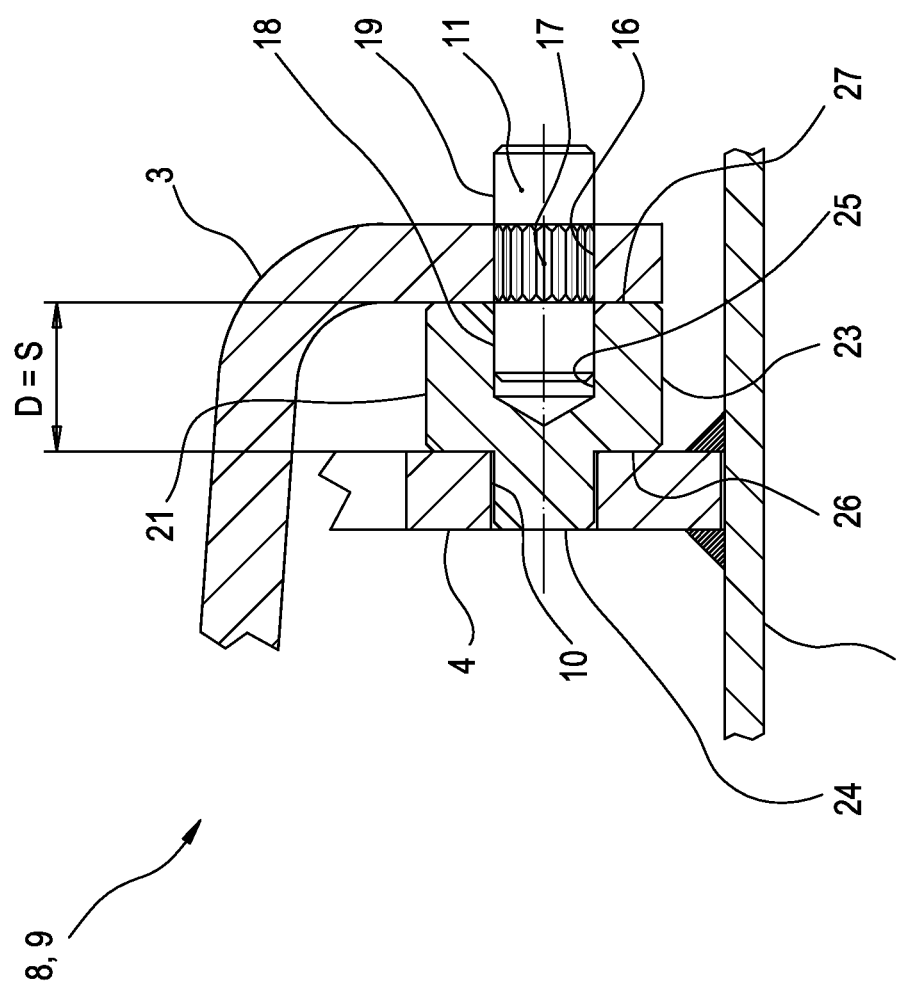
FIG. 5 is an enlarged view of the section in FIG. 3.

With reference to FIG. 5, each centring device 8, 9 comprises a hole 10 and a pin 11, the hole 10 being provided in the connecting member 4 and the pin 11 being mounted on the disc 3.

The pin 11 is mounted with forced coupling or interference in an opening 16 of the disc 3, in particular, the pin 11 comprises a central, for example knurled, zone 17, intended for being in contact with walls of the opening 16, The pin 11 further comprises a first end 18 protruding from the disc 3 to the connecting member 4. The pin 11 can further comprise a second end 19, opposite the first end 18, protruding from a face of the disc 3 opposite the face from which the first end 18 protrudes. The first end 18 and the second end 19, which are both cylindrical in shape, have diameters that are substantially the same as one another. Hereinafter, when reference is made to the dimensions, and in particular to the diameter, of the pin 11, the dimensions, and in particular the diameter, of one of the protruding ends of the pin 11 is meant, namely of the first end 18 or of the second end 19.

The fact that the first end 18 and the second end 19 protrude from faces of the disc 3 that are opposite one another enables the same pin 11 to be used for centring between disc 3 and rim 2 also in the configuration in which the disc 3 is rotated by 180° with respect to the central diametral plane M of the rim 2, as will be disclosed below.

Each centring device 8, 9 further comprises a coupling element 21 cooperating with the hole 10 and with the pin 11 for reciprocally coupling the pin 11 and the hole 10. The coupling element 21 comprises a body provided with a first portion 23, for example of cylindrical shape.

The first portion 23 is provided with a cavity 25, arranged for receiving in a shapingly coupled manner the first end 18, or the second end 19, of the pin 11. The cavity 25 extends centrally to the first portion 23.

The first portion 23 is interposed between the connecting member 4 and the disc 3. The first portion 23 is provided with a first arresting surface 26 and with a second arresting surface 27 intended for contacting respectively the connecting member 4 and the disc 3.

Further, the first portion 23 compensates the distance between the disc 3 and the connecting member 4 set by the spacers 15. Thus the first portion 23 has a longitudinal extent D that is substantially the same as the thickness S of the spacer 15.

The body of the coupling element 21 further comprises a second portion 24, which projects from the first portion 23 so as to form a stem. In particular, the stem 24 projects from the first arresting surface 26, centrally thereto.

The second portion or stem 24 is so conformed as to be received in a shapingly coupled manner in the hole 10 of the connecting member 4. The stem 24 is housed in the hole 10 with free coupling.

The coupling element 21 enables the dimensions of the pin 11 to be disconnected from those of the hole 10 and vice versa.

In fact, the difference in dimensions, in particular in diameter, that may be present between the pin 11 and the hole 10 is compensated by the coupling element 21.

Thus the coupling element 21 enables only the disc or only the rim of a variable track wheel to be replaced without it being necessary to implement mechanical machinings on the disc and/or on the rim to be coupled to maintain the centring device effective. In other words, the coupling element acts as an adapter, which enables the pin to be compatible with the dimensions of the hole.

If, for example, in the case of replacement of the rim or of the disc, the pin on the disc has too small a diameter compared with the diameter of the hole on the connecting member, the centring device does not operate, inasmuch as the excessive play between pin and hole does not permit precise coupling and thus sufficiently precise alignment of the axis of the rim and of the axis of the disc. In this case, the coupling element 21 will be conformed as to 'increase' the reduced dimensions of the pin, such as to make the coupling between pin and hole of the centring device more precise.

In the absence of the coupling element 21 that is specifically shaped for adapting to the dimensions of the pin 11, it would be necessary to remove the pin 11 from the forced coupling with the opening 16, widen this opening 16 and mount therein a new pin of larger dimensions that are compatible with the hole 10; alternatively it would be necessary to widen the hole 10 on the connecting member 4 or provide a new hole 10. Such operations might not be easily performable on the place in which the disc or the rim is replaced, with the risk of damaging the disc or the connecting member and making the centring device ineffective. Further, such operations could modify the weight of the disc and/or of the rim, thus causing the wheel to be no longer balanced.

Similarly, if, for example, in the event of replacement of the rim or of the disc, the pin on the disc has a diameter that is greater than the diameter of the hole on the connecting member, the centring device might not be reused. In this case, it is sufficient to provide a coupling element that is specifically shaped to house the pin, for example the cavity 25 will have a diameter that is such as to house in a shapingly coupled manner the pin 11 of greater dimensions, whereas the stem 24 will have substantially the same dimensions as the hole 10.

The coupling element 21 will thus be shaped in such a manner as to adapt to the dimensions of the hole 10 and to the dimensions of the pin 11 and in this manner adapt that hole 10 to that pin 11.

In other words, instead of machining mechanically the spare parts or the parts on which the latter are mounted, it is possible to provide a certain range of coupling elements that differ from one another through the dimensions of the opening and of the stem to reuse the coupling device in the event of replacement. Such coupling elements enable the parts of the centring device to be adapted that are arranged respectively on the disc and on the rim. Owing to the coupling element, it is possible to choose a centring device in which the hole has different dimensions from the pin.

In particular, the two centring devices 8, 9 can differ from one another by the respective dimensions of the hole or of the pin.

Figure 3:
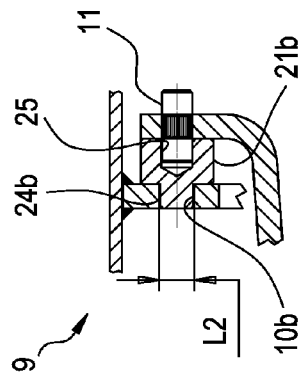
FIG. 3 is an enlarged cross section taken along the plane III-III in FIG. 1.
Figure 4:
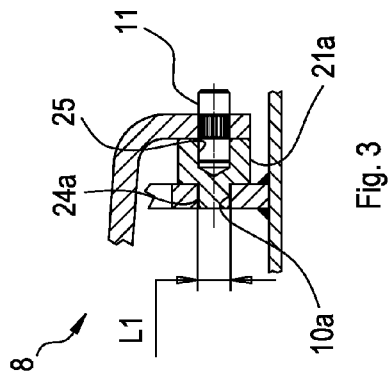
FIG. 4 is an enlarged cross section taken along the plane IV-IV in FIG. 1.

In the embodiment illustrated in FIGS. 3 and 4, the first centring device 8 (FIG. 3) comprises a hole 10a of diameter L1 and the second centring device 9 (FIG. 4) comprises a hole tab of diameter L2, wherein L1 and L2 are different from one another. The first centring device 8 thus comprises a first coupling element 21a provided with a stem 24a of a diameter that is such as to be housed in the hole 10a with free coupling. In other words, the diameter of the stem 24a is substantially the same as the diameter L1 or the hole 10a, less the coupling tolerance. Similarly, the second centring device 9 comprises a second coupling element 21b having a stem 24b of a diameter that is such as to be housed in the hole 10b with free coupling. In other words, the diameter of the stem 24b is substantially the same as the diameter L2 of the hole 10b, less the coupling tolerance. In this embodiment, the pin of the first centring device 8 and the pin of the second centring device 9 are the same as one another and these pins are indicated by the same reference number 11. Consequently, also the cavity 25 has the same dimensions on the two coupling elements 21a and 21b.

In one embodiment that is not shown, the hole 10 can be provided on the disc 3 and the pin 11 on the connecting member 4. In this embodiment, the coupling element 21 is arranged rotated by 180° around a diametral plane of the rim with respect to the arrangement shown in FIG. 4 of the coupling element 20, i.e. the stem 24 is to the right of the cavity 25, not to the left, as shown in FIG. 4, and both stem 24 and cavity 25 will extend from left to right, and not from right to left as in FIG. 4.

The centring devices 8, 9 are made during manufacture of the wheel 1.

The disc 3 and the rim 2 are arranged substantially concentrically in a mask. Naturally, the manufacturing tolerances of the passage 12 on the connecting member 4 of the fixing hole 13 on the disc 3, and of the through hole 14 on the spacer 15 are such as to enable the position of the disc 3 to be adjusted in relation to the rim 2 in such a manner as to be able to align together the passages 12, the fixing holes 13 and the through hole 14 before the bolts 6 are tightened and the substantially concentric position of the disc 3 and rim 2 is fixed.

In the substantially concentric position of the disc 3 and of the rim 2, the holes 10, or 10a and 10b are made respectively on the connecting member 4 and the openings 16, or 16a and 16b, on the disc 3.

Subsequently, the bolts 6 are loosened and the disc 3 and the rim 2 are again moved away, such that the pins 11 can be mounted on the disc 3. The coupling element 21, or 21a and 21b, is associated with the corresponding pin 11. By again repositioning the disc 3 and the rim 2 on the mark in the substantially concentric position, the coupling element 21, or 21a and 21b, is now inserted into the hole 10, or 10a and 10b, and the first portion 23 is interposed between the disc 3 and the rim 2. The bolts 6 are tightened and the mask is removed.

At this point the wheel 1 is ready for being subjected to balancing and marking.

Marking the rim at the high—or positive value point of the first harmonic of the wheel—is known, which first harmonic is defined as the assembly of the rim and of the disc—and marking the wheel at the low—or negative—value point of the first harmonic of the wheel, By mounting the wheel on the rim in such a manner that the position of the high value of the wheel substantially coincides with the position of the low value of the wheel, compensation is obtained of the geometrical manufacturing errors and of the distribution of the masses of the wheel and of the tyre, which are one of the causes of vibrations in the vehicle. In this manner, lack of uniformity of the wheel-tyre assembly is minimised, increasing the comfort of the driver of agricultural vehicles that are intended to travel at 50 km/h.

In all the embodiments disclosed above, owing to the coupling element 21, it is possible to find at each reassembly of the rim 2 and of the disc 3 the alignment position of the respective axis, in which preset balancing of the wheel 1 is obtained.

The coupling element 21, or 21a and 21b, enables centring of variable track wheels to be obtained, in which varying of the wheel track is possible owing to the presence of spacers, such as the spacers 15 in the embodiments shown.

Figure 6:
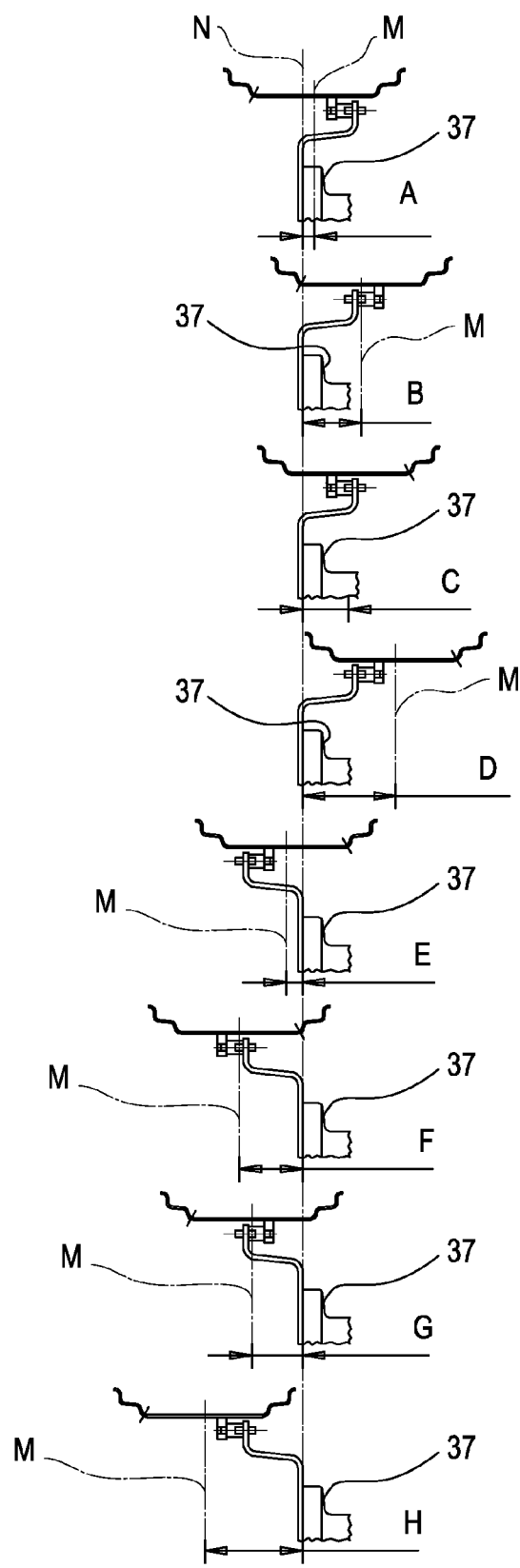
FIG. 6 shows fragmentary and shrunk cross sections of the wheel in FIG. 1 corresponding to axial positions that are different from one another of the wheel and of a hub.

The disc 3 and the rim 2 can also be mounted according to positions that are different from one another that are illustrated in FIG. 6. With reference to FIG. 6, A-H indicate the different distances that are obtainable between the central diametral plane M of the wheel 1 and a mounting plan N of the hub 37 against which the disc 3 is mounted when the axial mounting position between the rim 2 and disc 3 is varied, for example by mounting the flange region to the left of the connecting member rather than to the right and/or by rotating the disc 3 around the vertical diameter.

Varying the distance between the central diametral plane M and the mounting plane N of the hub 37 moves a pair of wheels 1 of the vehicle nearer or further that are mounted on the same axle.

FIG. 6 illustrates how the position of the connecting element 21 varies with the varying of the position between the disc 3 and rim 2.

The connecting element 21 ensures that the rim 2 and the disc 3 can be reassembled in the substantially concentric position even when the track of the vehicle on which the wheel 1 is mounted is varied, in accordance with one of the corresponding positions of the disc 3 and rim 2 shown in FIG. 6.

Further, the embodiment in which two centring devices 8 and 9 are provided that are different from one another, ensures in an effective manner that the assembly of the rim 2 on the disc 3 occurs on the same substantially concentric position made during the wheel 1 manufacturing step, without the risk that the coupling element 21a can be coupled with the hole 10b, if diametrically opposite, or vice versa that the coupling element 21b can be coupled with the hole 10a.

This significantly limits the possibility of an error in mounting the rim 2 on the disc 3, in particular in the event of replacement of the tyre, in which the disc 3 remains mounted on the axis of the wheels of the vehicle and the rim 2 is remounted on the disc 3 that is already provided with the new tyre. It should be observed that the wheels of agricultural vehicles such as tractors are rather bulky and positioning the rim with respect to the disc directly on the vehicle can be rather difficult when in the field.

We claim:

1. A variable track wheel comprising a rim suitable for receiving a tire, and a disc through which said wheel is mountable on a hub, said disc being removably secured by fastenings to a connecting member provided in said rim, said connecting member projecting towards a rotation axis of said wheel, said wheel further comprising a plurality of spacers interposed between an annular perimeter zone of said disc and said connecting member of said rim, said disc and said rim being mountable in a plurality of reciprocal axial positions and in a plurality of reciprocal orientations to obtain a variation in the track of said wheel, said wheel further comprising at least one centring device for mutual positioning of said disc and of said rim, said centring device comprising a hole and a pin, said hole or said pin being provided in said connecting member or in said disc, characterized in that said centring device further comprises a coupling element conformed to cooperate with said hole and with said pin for reciprocally coupling said pin and said hole, wherein said coupling element comprises a first portion wherein a cavity is obtained, arranged for receiving in a shaping coupled manner an end of said pin and said first portion is conformed to compensate the distance between said disc and said connecting member, said first portion being interposed between said connecting member and said disc, wherein said first portion is provided with a first arresting surface and with a second arresting surface intended for contacting respectively said connecting member and said disc.

2. The wheel according to claim 1, wherein said cavity extends centrally to said first portion.

3. The wheel according to claim 2, wherein said coupling element further comprises a second portion, that projects from said first portion so as to form a stem, said stem being conformed to be received in a shapingly coupled manner in said hole.

4. The wheel according to claim 3, wherein said stem projects from a substantially central portion of said first arresting surface.

5. The wheel according to claim 2, further comprising:
   a. a further centring device, substantially conformed as said centring device;
   b. a further pin; and c. a further coupling element, said centring device and said further centring device being arranged at a distance that is substantially equal distance from said rotation axis.

6. The wheel according to claim 5, wherein said further centring device is diametrically opposite said centring device.

7. The wheel according to claim 5, wherein said further centring device differs from said centring device by a diameter of said further hole and/or of said further pin and/or of said further coupling element, when compared with the corresponding diameter of said hole and/or of said pin (11) and/or of said coupling element.

\* \* \* \* \*